Aug. 1, 1961 A. E. W. VAN DIEPENBROEK 2,994,407
ROTARY DUST SEPARATOR
Filed June 27, 1958

United States Patent Office 2,994,407
Patented Aug. 1, 1961

2,994,407
ROTARY DUST SEPARATOR
Alfred E. W. van Diepenbroek, Amersfoort, Netherlands, assignor to N.V. Bronswerk, Amersfoort, Netherlands, a Dutch company
Filed June 27, 1958, Ser. No. 745,122
Claims priority, application Netherlands June 29, 1957
1 Claim. (Cl. 183—63)

This invention relates to rotary dust separators.

For separating out solid particles suspended in a gas, various devices have been proposed. The choice of the type of separator depends, inter alia, on the nature and the concentration of the dust and on the temperature and the nature of the gas.

Centrifugal separators and cloth filters are applied to a large extent in the art of separating dust. Less applied are the electrostatic separators in view of the absence of selectively and the high costs, the scrubbers in view of the change in the gas condition and of the involved problem of purifying the water, and the gravity separators and the separators working according to the principle of the impinging gas stream in view of their insufficient separation.

The fact that so many systems are used in practice is due to the fact, that each known separator has, besides its specific advantages, one or more disadvantages limiting its use.

For instance for cloth filters, a high concentration of the dust in the gas has a bad effect on the separation and on the dimensions of the device.

The necessary cleaning of the filter cloth decreases the life of the separator and has a bad effect on the separation. Hereby large dimensions of the filter surface become necessary.

The filter-cloth is easily damaged by sharp and hot particles, whereby the separation practically stops.

An advantage of the cloth filters is, however, that they can separate very fine dust, in contradistinction to the centrifugal separators.

Centrifugal separators, e.g. cyclones, cannot separate very fine dust.

Moreoever they are influenced by disturbances in the flow of the gas to the separator, by unevenness of the separator wall and moreover the effect of separation is decreased, when the load is decreased. On the other hand, they have the advantages that they are insensitive to high concentrations of the dust and that they can separate sharp or hot dust particles.

It has already been tried to use a combination, e.g. by passing the gas to be cleaned first through a cyclone and thereafter through a filter. However, in this combination, each device has a bad influence on the operation of the other device, as when the filter becomes somewhat filthy, the volume of gas is decreased, whereby the separation in the cyclone is decreased and again the filter becomes more filthy, etc., so that an unfavourable chain-reaction will set in.

Moreover, such a combination is expensive and voluminous, so that it is only exceptionally applied in practice.

It is an object of the invention to combine a centrifugal separator and a filter separator into a single apparatus in such a manner, that the good qualities of both types are not only maintained, but are even improved and that the negative qualities are neutralised.

For these purposes, the centrifugal dust separator according to the invention is provided with a housing in which a rotor is arranged, which is formed by a plurality of spaced rods or similar elements parallel to the rotor shaft, between which rods the dust-laden gas or air passes through the rotor from the outside to the inside, a filter cloth being stretched over said rods or elements.

In order to increase the filtering surface, this filter cloth may be arranged in longitudinal folds or in transversal folds along the circumference of the rotor.

In the separator according to the invention, the gas pressure in the rotor housing is higher than inside the rotor. Hereby the gas is forced to flow through the rotor and consequently through the filter cloth. However, the fast rotating rotor also moves the gas around its circumference in the direction of rotation. Now, when the gas flows near the rotor, the centrifugal force will operate upon the gas and upon the dust-particles. The result will be, that the dust-particles will obtain a substantially increased shifting velocity with regard to the gas and will try to move away from the rotor. In fact, up to a certain grain size, the obtained shift-velocity will be sufficient to move the particle in a direction opposed to the direction of the gas, which means that this particle and all particles of the same size and of larger size will be separated.

Through a slot in the wall of the rotor housing, or in a container communicating with this housing, these coarse dust-particles can be accumulated. The finer dust-particles, however, will be moved with the gas flow to the filter surface and be deposited thereon.

However, the quantity of particles deposited on the filter surface will be much smaller than the quantity of particles originally present in the gas, in view of the prior centrifugal separation described.

The fine dust-particles thus will be deposited on the outer circumference of the filter-cloth and after some time will form a layer thereon. As the centrifugal force continues to be exerted on this layer, a condition will soon be reached, in which the centrifugal force working on the layer will be larger than the force of the gas by which the layer is pressed onto the filter cloth.

Consequently parts of the dust layer or -cake will be centrifuged off from the filter cloth and will be accumulated in the dust collecting tank via the outlet opening in the housing.

In this manner, the filter-cloth is automatically cleaned and the capacity of the separator is maintained. Cleaning of the filter cloth by beating off the dust from the cloth is unnecessary.

With the separator according to the invention, a better separation is possible than with the known cloth-filter separators, as the beating or knocking off of the cloth filter is superfluous and as the loading with dust of the filter is decreased and as moreover the force of penetration of the dust into the filter is smaller. By the uniform flow of the gas through the circumference of the rotor the centrifugal separation is improved, as this separation is not endangered by fluctuations in the gas supply, by an uneven surface of the walls of the separator and by variations in the capacity. A decreased capacity even improves the centrifugal separation, so that the filter cloth is discharged, even if the quantity of dust per unit of time remains the same.

The separator according to the invention has small dimensions and is less expensive than the known combination of a centrifugal separator with separate cloth-filters.

The only limitation for the application of the separator according to the invention is the temperature of the medium to be separated.

The invention will now be described with the aid of drawing showing two dust separators according to the invention.

Figures 1, 2:
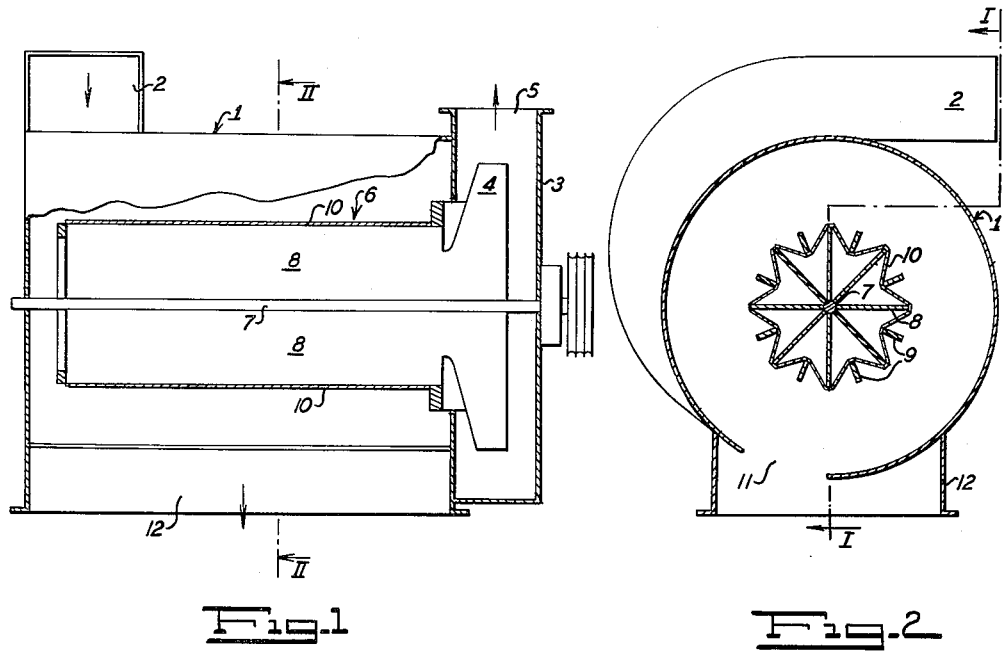
FIGURE 1 is a vertical sectional view of a dust separator according to the invention.
FIGURE 2 is a cross-section on line II—II of FIGURE 1.

Referring to FIGS. 1 and 2, the rotor housing is indicated by 1. At one side a tangential inlet 2 for the dust laden air or gas and at the other side a ventilator housing 3 with a blower 4 and an outlet 5 for the cleaned air are connected to this housing 1.

Rotatably arranged in the rotor housing is a rotor, generally indicated by 6. This rotor consists of a plurality of radial partitions 8, between which shorter radial plates 9 are arranged. A filter cloth 10 is stretched in zig-zag-fashion between the plates 8 and 9. At the lower side a longitudinal slot 11 is arranged in the wall of the rotor housing 1, through which slot and via an outlet 12 the separated dust particles are discharged into a collecting tank (not shown).

The operation of the above-described separator is as follows:

Through the tangential inlet 2, the dust-laden air or gas is supplied to the housing 1 in the direction of rotation of the rotor 6 and flows through this rotor 6 from the outside to the inside. The cleaned air flows via the blower 4 to the outlet 5.

Figure 3:
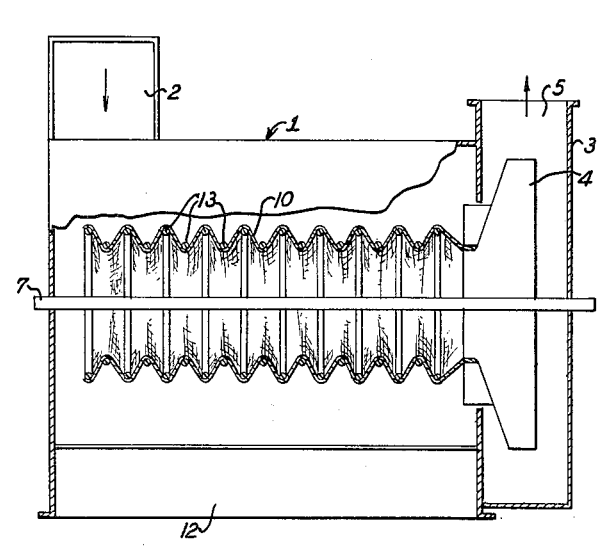
FIGURE 3 is a vertical sectional view of a second embodiment according to the invention.

The modification schematically shown in FIGURE 3 only differs from the embodiment already described, in that the filter cloth 10 is stretched in a zig-zag-fashion over ring-shaped rotor rods 13 in the longitudinal or axial direction of the rotor.

It will be obvious, that other variations are possible within the scope of the inventon.

Although in the embodiment according to FIGS. 1 and 2 the blower 4 and the rotor 6 are mounted on the same shaft, this is, of course, not necesary.

If no blower directly connected to the rotor is applied, it is preferred to form the space around the gas-outlet of the rotor in the shape of a volute or of a diffusor.

Moreover, a plurality of rotors may be arranged in one common rotor-housing.

From the foregoing description taken in connection with the drawing, it is thought that the construction, operation and advantages of my invention will be readily understood, without requiring a more extended explanation.

Having described my invention, what I claim as new and desire to secure by Letters Patent, is:

A dust separator comprising a housing defining an internal generally cylindrical chamber, a tangential inlet coupled to said housing at one end of the latter for feeding dust laden air to said chamber in a determinable rotary direction, said housing having a peripheral dust outlet, the dust particles being in either one of two arbitrary size categories, a rotor in said chamber, a continuous filter cloth supported on and encircling said rotor and being rotatable therewith, said filter cloth defining in said chamber a confined zone, means at the opposite end of said housing and operatively coupled to said zone to reduce the pressure therein whereby said air is drawn through said filter cloth, and means coupled to and rotating said rotor in said determinable rotary directions, both means being correlated with respect to pressure in said zone and speed of said rotor that particles having a size in the larger of the categories are flung by centrifugal force against said housing, the remaining particles accumulatng on said filter cloth being agglomerated thereupon for being flung from said cloth in a self-cleaning action, said rotor comprising a rotatable shaft, a first group of radial fins extending from said shaft, and a second group of radial fins supported on, but spaced from, said shaft, said cloth being supported by both groups of fins and having a zig-zag configuration defined by the outer extremities of the fins of said first group and by the innermost extremities of the fins of said second group.

References Cited in the file of this patent

UNITED STATES PATENTS

| 788,882 | Brantingham | May 2, 1905 |
| 1,899,794 | Coupard | Feb. 28, 1933 |
| 2,228,129 | Stephano | Jan. 7, 1941 |
| 2,643,734 | Rowell | June 30, 1953 |
| 2,718,933 | Norbom | Sept. 27, 1955 |

FOREIGN PATENTS

| 235,301 | Great Britain | June 11, 1928 |
| 218,022 | Switzerland | May 1, 1942 |